United States Patent Office 2,945,838
Patented July 19, 1960

2,945,838

AMIDE STABILIZED ORGANOPOLYSILOXANE COMPOSITIONS AND THEIR PREPARATION

Maurice Prober, Schenectady, N.Y., assignor to General Electric Company, a corporation of New York No Drawing. Filed Oct. 27, 1955, Ser. No. 543,251

13 Claims. (Cl. 260—45.9)

This invention relates to stabilized organopolysiloxane compositions and to the preparation thereof. More particularly, this invention is concerned with elastomeric organopolysiloxane compositions which are stabilized with from 0.05 to 5 percent and preferably about 0.1 percent by weight, based on the weight of the organopolysiloxane, of a monomeric amide containing at least one amido nitrogen-bonded hydrogen atom and which has a boiling point in excess of about 280° C.

Organopolysiloxanes, although relatively new in the polymer field, have gained wide acceptance because of their outstanding thermal stability. These compositions are noted for their stability at temperatures as high as 150–250° C. depending on the particular organopolysiloxane. However, for some applications, it would be desirable to increase the thermal stability of these compositions even more so that they may be employed at temperatures of from 200–300° C., a 50° advance over the thermal stability of prior materials.

Accordingly, the object of the present invention is to provide elastomeric organopolysiloxane compositions which are characterized by increased thermal stability over previously known materials.

This and other objects of my invention are accomplished by incorporating into the elastomeric organopolysiloxane from 0.05 to 5 percent by weight of a monomeric amide or amides having the characteristics described above.

The amides within the scope of my invention are characterized by containing the amido group

and by having a normal boiling point (boiling point at 1 atm.) in excess of about 280° C. The boiling point is necessary so that the amides will not be evaporated from the organopolysiloxane compositions at the elevated temperatures at which these compositions are employed. Amides having a normal boiling point in excess of 280° C. at one atmosphere include amides which actually have a one atmosphere boiling point in the range described as well as amides which decompose before boiling at one atmosphere, but which have vapor pressure-temperature characteristics which when extrapolated would indicate that they would boil above 280° C. if they did not decompose first. Amides within the scope of the present invention include diamides of dibasic acids, such as urea, and the diamides of oxalic acid, malonic acid, succinic acid, glutaric acid, adipic acid, pimelic acid, suberic acid, azelaic acid, sebacic acid, etc. In addition, amides of the present invention include the diamides prepared from the above-recited dibasic acids and amines such as methylamine, t-butylamine, aminoethane, aminooctane, etc. Furthermore, amides within the scope of the present invention may be the amides prepared from reaction of monobasic or dibasic carboxylic acids with aromatic amines such as aniline, o-toluidine, m-toluidine, p-toluidine, the xylidines, etc. Furthermore, amides within the scope of this invention include the aryl-substituted ureas such as diphenyl urea and ditolyl urea. In addition to the primary amides disclosed above, secondary amides such as dibenzoyl amide, are also within the scope of the present invention. Other amides within the scope of the present invention are aromatic amides such as, for example, benzamide, α-benzylacetamide, β-benzylpropionamide, etc.

The organopolysiloxanes employed in the practice of the present invention may be defined as having the following average structure:

(1)

where R is a member selected from the class consisting of alkyl radicals, e.g., methyl, ethyl, propyl, butyl, etc. radicals, alkenyl radicals, e.g., vinyl, allyl, etc. radicals; aryl radicals, e.g., phenyl, benzyl, methylphenyl, xylyl, etc. radicals; aralkyl radicals, e.g., benzyl, phenylethyl, etc. radicals, chloroalkyl radicals, e.g., chloromethyl, β-chloroethyl, fluoroethyl, etc. radicals; and haloaryl radicals, e.g., chlorophenyl, dibromophenyl, tetrachlorophenyl, etc. radicals; and $a$ has a value of from 1.98 to 2.3.

These organopolysiloxane compositions comprise siloxane chains containing alternate silicon and oxygen atoms with the R groups attached to silicon through silicon-carbon linkages.

Among the elastomeric organopolysiloxanes which may be stabilized by the process of the present invention are those organopolysiloxanes which are commonly referred to as "convertible organopolysiloxanes." These "elastomeric" or "convertible" organopolysiloxanes are described by Formula 1 when $a$ has a value of from about 1.98 to 2.01. Although convertible organopolysiloxanes are well known in the art for the purposes of showing persons skilled in the art examples of the various convertible organopolysiloxanes which may be employed in the practice of the present invention, attention is directed to the convertible compositions disclosed and claimed in Agens Patent 2,448,756, Sprung et al. Patent 2,448,556, Sprung Patent 2,484,595, Krieble Patent 2,457,688, Hyde Patent 2,490,357, Marsden Patent 2,521,528, and Warrick Patent 2,541,137.

The method of preparing these elastomeric or convertible organopolysiloxanes is well known in the art and these compositions are generally obtained by condensation of a liquid organopolysiloxane or a mixture of liquid organopolysiloxanes containing an average of from about 1.98 to 2.01 silicon-bonded organic groups per silicon atom. The usual condensing agents which may be employed and which are also well known in the art for that purpose, may include, for example, ferric chloride hexahydrate, phenylphosphoryl chloride, alkaline condensing agents such as potassium hydroxide, sodium hydroxide, cesium hydroxide, solid tetramethyl ammonium hydroxide, solid benzyl trimethyl ammonium hydroxide, and quaternary phosphonium hydroxides such as tetra-n-butyl phosphonium hydroxide. Generally I prefer to use as a starting liquid organopolysiloxane from which the convertible organopolysiloxane is prepared one which contains about 1.999 to 2.005, inclusive, organic groups, such as methyl groups, per silicon atom and where more than about 90 percent, and preferably about 95 percent, of the silicon atoms in the organopolysiloxane contain 2 silicon-bonded alkyl, preferably methyl, groups.

These convertible organopolysiloxanes are convertible to the cured, solid, elastic state generally by application of heat. Where desired a small amount of a cure accelerator, for instance, benzoyl peroxide, tertiary butyl perbenzoate, zirconyl nitrate, etc., may be incorporated into the convertible organopolysiloxane for the purpose of accelerating its cure as is more particularly described in various patents calling for the use of these materials as cure accelerators for silicone rubber. The cure accelerator functions to yield cured products having better properties, for example, improved elasticity, tensile strength and tear resistance than are obtained by curing similar organopolysiloxane compositions containing no cure accelerator. The amount of cure accelerator which may be used may be varied, for example, from about 0.1 to 8 percent or more, and preferably from about 1 to 4 percent, by weight, of the cure accelerator, based on the weight of the convertible organopolysiloxane.

The convertible organopolysiloxanes may also have fillers incorporated therein such as, for example, silica, silica aerogel, titanium dioxide, calcium silicate, ferric oxide, chromic oxide, cadmium sulfide, asbestos, glass fibers, calcium carbonate, carbon black, lithophone, talc, etc.

In stabilizing elastomeric or convertible organopolysiloxanes by the method of the present invention, the amide is simply milled into or otherwise mixed with the convertible organopolysiloxane after it has been prepared or during the preparation. Thus, where the convertible organopolysiloxane is to be employed without any filler or cure accelerator, from 0.05 to 5 percent by weight of the amide is milled into the organopolysiloxane on differential rubber milling rolls. Where the convertible organopolysiloxane is to contain either a filler or a cure accelerator or both, it is convenient to add the filler, the cure accelerator and the amide to the convertible organopolysiloxane on differential rubber milling rolls.

In order that those skilled in the art may better understand the practice of the present invention, the following limitation.

*Example 1*

This example illustrates the stabilizing ecect of amides example is given by way of illustration and not by way of on silicone elastomers. A highly viscous convertible organopolysiloxane, specifically a polymeric dimethyl siloxane, substantially non-flowable at room temperature, was prepared by condensing at a temperature of about 140° C. for about 6 hours, octamethylcyclotetrasiloxane with about 0.01 percent by weight of potassium hydroxide. This polymer was soluble in benzene and had slight flow at room temperature. One hundred parts by weight of this convertible organopolysiloxane was mixed with 40 parts by weight of silica aerogel (Santocel-C, manufactured by the Monsanto Chemical Co.), and 1.7 parts by weight of benzoyl peroxide. The resulting mixture was milled on differential rubber compounding rolls until a uniform mixture was obtained. Four aliquots of this milled mixture were collected and the first aliquot was kept as a control. To the remaining three aliquots, 0.4 percent by weight, based on the weight of the organopolysiloxane, of one of the following three amides was added by milling on the differential rubber compounding rolls: adipamide, urea, and diphenyl urea. Each of these four samples was cured in a press for twenty minutes at 125° C. oven cured for one hour at 150° C. and oven cured for 24 hours at 250° C. At this time the tensile strength, percentage elongation, and durometer hardness (Shore A) were measured. The four samples were then placed in a 300° C. circulating air oven and the same properties were again measured after two days of 300° C. aging. The following table gives the results of these measurements before and after the 300° C. aging.

|  | Additive | Before 300° C. Aging | After 2 days at 300° C. |
|---|---|---|---|
| Tensile Strength (p.s.i.) | None | 720 | Failed |
|  | Adipamide | 760 | 620 |
|  | Urea | 710 | 570 |
|  | Diphenyl urea | 730 | 314 |
| Elongation (percent) | None | 200 | Failed |
|  | Adipamide | 200 | 200 |
|  | Urea | 150 | 100 |
|  | Diphenyl urea | 150 | 100 |
| Durometer Hardness (Shore A). | None | 53 | Failed |
|  | Adipamide | 53 | 58 |
|  | Urea | 53 | 79 |
|  | Diphenyl urea | 53 | 77 |

At the end of the two day aging period the silicone rubber containing no additive became charred and brittle and crumbled and its tensile strength and percent elongation were negligible. The durometer hardness of this sample was unmeasurable since the material crumpled. The data in this table show that the additives described greatly increase the thermal stability of the methylsilicone rubber and allow its use at 300° C. instead of the previous 250° C. maximum.

It will, of course, be apparent to those skilled in the art that in addition to the organopolysiloxane elastomers described in the example, other organopolysiloxanes, many examples of which have been given previously, can be stabilized by the process of the present invention. It is also apparent that the ratio of the stabilizing amide to the organopolysiloxane can also vary within limits broader than those specigcally described in the examples. Generally I prefer not to employ more than about 5 percent by weight of the stabilizing amide although the use of higher amounts is not precluded. Furthermore, it is apparent that other amides than the three amides specifically described in the example may be used in the process of the present invention and these other amides are as described previously.

The organopolysiloxane elastomers of the present invention are useful in all of the conventional silicone rubber applications, such as gasket material, as electrical conductor insulation, etc.

The use of the elastomers of the present invention is particularly desirable in applications where thermal stability is required at temperatures higher than the temperature at which unstabilized silicone materials are unsatisfactory.

What I claim as new and desire to secure by Letters Patent of the United States is:

1. A composition comprising (1) an organopolysiloxane convertible to the cured solid elastic state and having the average structure

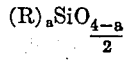

$$(R)_a SiO_{\frac{4-a}{2}}$$

where R is a member selected from the class consisting of alkyl, alkenyl, aryl, aralkyl, chloroalkyl and chloroaryl radicals and a has a value of from 1.98 to 2.01, inclusive, and (2) from 0.05 to 5 percent, by weight, based on the weight of (1) of an amide selected from the class consisting of (a) urea, (b) diphenyl urea, (c) diamides of oxalic, malonic, succinic, glutaric, adipic, pimelic, suberic, azelaic, and sebacic acids, (d) ditolyl urea, (e) dibenzoyl amide, (f) benzamide, (g) α-benzylacetamide, and (h) β-benzylpropionamide.

2. A composition comprising (1) an organopolysiloxane convertible to the cured solid elastic state and having the average structure

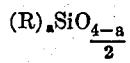

$$(R)_a SiO_{\frac{4-a}{2}}$$

where R is a member selected from the class consisting of alkyl, alkenyl, aryl, aralkyl, chloroalkyl and chloroaryl radicals and a has the value of from 1.98 to 2.01, inclusive, (2) from 0.05 to 5 percent, by weight, based on the weight of (1) of an amide selected from the class consisting of (1) of a monomeric amide selected from the class consisting of (a) urea, (b) diphenyl urea, (c) diamides of oxalic, malonic, succinic, glutaric, adipic, pimelic, suberic, azelaic, and sebacic acids, (d) ditolyl urea, (e) dibenzoyl amide, (f) benzamide, (g) α-benzylacetamide, and (h) β-benzylpropionamide, and (3) a filler.

3. An organopolysiloxane composition convertible to the cured solid elastic state as in claim 2 containing a curing agent for (1).

4. The cured composition of claim 4.

5. A methylpolysiloxane composition stable at elevated temperatures to the influence of heat comprising (1) a polydimethylsiloxane convertible to the cured solid elastic state containing an average of from 1.98 to 2.01, inclusive, methyl groups per silicon atom, (2) from 0.05 to 5 percent, by weight, based on the weight of (1) of an amide selected from the class consisting of (a) urea, (b) diphenyl urea, (c) diamides of oxalic, malonic, succinic, glutaric, adipic, pimelic, suberic, azelaic, and sebacic acids, (d) ditolyl urea, (e) dibenzoyl amide, (f) benzamide, (g) α-benzylacetamide, and (h) β-benzylpropionamide, (2) a filler, and (3) a curing agent for (1).

6. The cured product of claim 5.

7. An organopolysiloxane composition having an enhanced resistance to elevated temperatures comprising (1) a polydimethylsiloxane convertible to the cured solid elastic state and containing an average of from 1.98 to 2.01 methyl groups per silicon atom, (2) from 0.05 to 5 percent, by weight, based on the weight of (1) of urea, (3) a filler, and (4) a curing agent for (1).

8. The cured product of claim 7.

9. An organopolysiloxane composition having an enhanced resistance to elevated temperatures comprising (1) a polydimethylsiloxane convertible to the cured solid elastic state and containing an average of from 1.98 to 2.01 methyl groups per silicon atom, (2) from 0.05 to 5 percent, by weight, based on the weight of (1) of adipamide, (3) a filler, and (4) a curing agent for (1).

10. The cured product of claim 9.

11. An organopolysiloxane composition having an enhanced resistance to elevated temperatures comprising (1) a polydimethylsiloxane convertible to the cured solid elastic state and containing an average of from 1.98 to 2.01 methyl groups per silicon atom, (2) from 0.05 to 5 percent, by weight, based on the weight of (1) of diphenyl urea, (3) a filler, and (4) a curing agent for (1).

12. The cured product of claim 11.

13. The method of stabilizing an organopolysiloxane convertible to the cured solid elastic state having the formula $$(R)_a SiO_{\frac{4-a}{2}}$$

where R is a member selected from the class consisting of alkyl, alkenyl, aryl, aralkyl, chloroalkyl and chloroaryl radicals and $a$ has a value of from about 1.98 to 2.01, inclusive, which process comprises adding to said organopolysiloxane convertible to the cured solid elastic state from 0.05 to 5 percent, by weight, based on the weight of the convertible organopolysiloxane, of an amide selected from the class consisting of (a) urea, (b) diphenyl urea, (c) diamides of oxalic, malonic, succinic, glutaric, adipic, pimelic, suberic, azelaic, and sebacic acids, (d) ditolyl urea, (e) dibenzoyl amide, (f) benzamide, (g) α-benzylacetamide, and (h) β-benzylpropionamide.

References Cited in the file of this patent
UNITED STATES PATENTS

| | | |
|---|---|---|
| 2,389,802 | McGregor et al. | Nov. 27, 1945 |
| 2,389,807 | McGregor et al. | Nov. 27, 1945 |
| 2,447,483 | Baker et al. | Aug. 24, 1948 |
| 2,553,362 | Dannenberg | May 15, 1951 |
| 2,654,722 | Young et al. | Oct. 6, 1953 |
| 2,683,132 | Young et al. | July 6, 1954 |
| 2,710,839 | Swakon et al. | June 14, 1955 |

FOREIGN PATENTS

| | | |
|---|---|---|
| 571,662 | Great Britain | Sept. 4, 1945 |
| 851,256 | Germany | Oct. 2, 1952 |
| 882,260 | Germany | Aug. 10, 1953 |

OTHER REFERENCES

Post; Silicones and Other Organic Silicon Compounds, 1949, p. 88, publ. by Reinhold Publ. Corp., N.Y.

Noller; Textbook of Organic Chemistry, 1951, p. 243, publ. by W. B. Saunders Co., Phila., Pa.

Shaw et al.; Rubber World, August 1954, p. 636–642.

Lange; Handbook of Chemistry, 1946, p. 476, publ. by Handbook Publ. Inc., Sandusky, Ohio.